United States Patent [19]

Thomas

[11] 4,130,036

[45] Dec. 19, 1978

[54] APPARATUS FOR CUTTING TUBES

[75] Inventor: Anthony V. Thomas, Prospect Heights, Ill.

[73] Assignee: Precision Paper Tube Compay, Wheeling, Ill.

[21] Appl. No.: 839,806

[22] Filed: Oct. 6, 1977

[51] Int. Cl.² ............................................. B23B 5/14
[52] U.S. Cl. ....................................... 82/90; 82/101; 82/102; 82/48
[58] Field of Search ................. 82/48, 85, 90, 91, 101, 82/102, 46

[56] References Cited

U.S. PATENT DOCUMENTS

| 2,321,735 | 6/1943 | Clifford | 82/92 |
| 3,230,804 | 1/1966 | Pezzoli | 82/85 |
| 3,481,234 | 12/1969 | Luce | 82/48 |
| 3,550,490 | 12/1970 | Hicks | 82/48 |

*Primary Examiner*—Leonidas Vlachos

*Attorney, Agent, or Firm*—Tilton, Fallon, Lungmus & Chestnut

[57] ABSTRACT

The apparatus includes a cradle for holding long tubes desired to be cut into individual tubes of shorter length. The cradle is generally cylindrical and mounted for rotation about its axis. Tubes are mounted in the cradle at a loading position, and a controller actuates a motor for driving the cradle inrotation to a cutting position. A plurality of saws are mounted on a shaft extending parallel with the axis of the cradle and rotating at high cutting speed. When the cradle is revolved to bring the tube to the cutting station, the tube is engaged by a surface belt drive to spin the tube in the cradle for cutting. In the case of tubes having greater wall thickness, the cradle is stopped momentarily just as the tubes are brought into cutting relation with the saws so that a partial peripheral cut is made while the cradle is stopped. The cradle is then continued to be rotated to complete the cut and to bring the cut tubes back to the original position at high speed.

2 Claims, 9 Drawing Figures

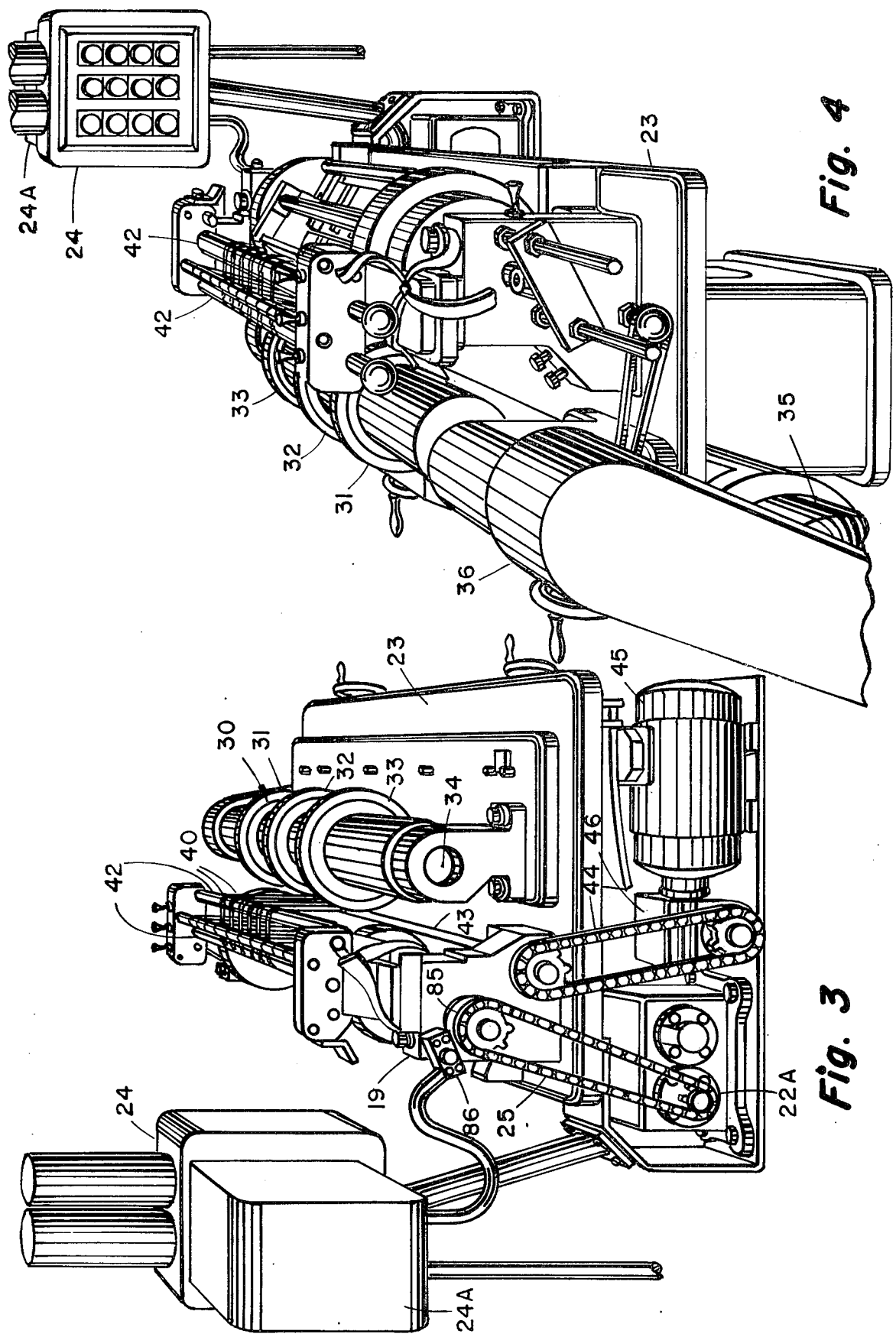

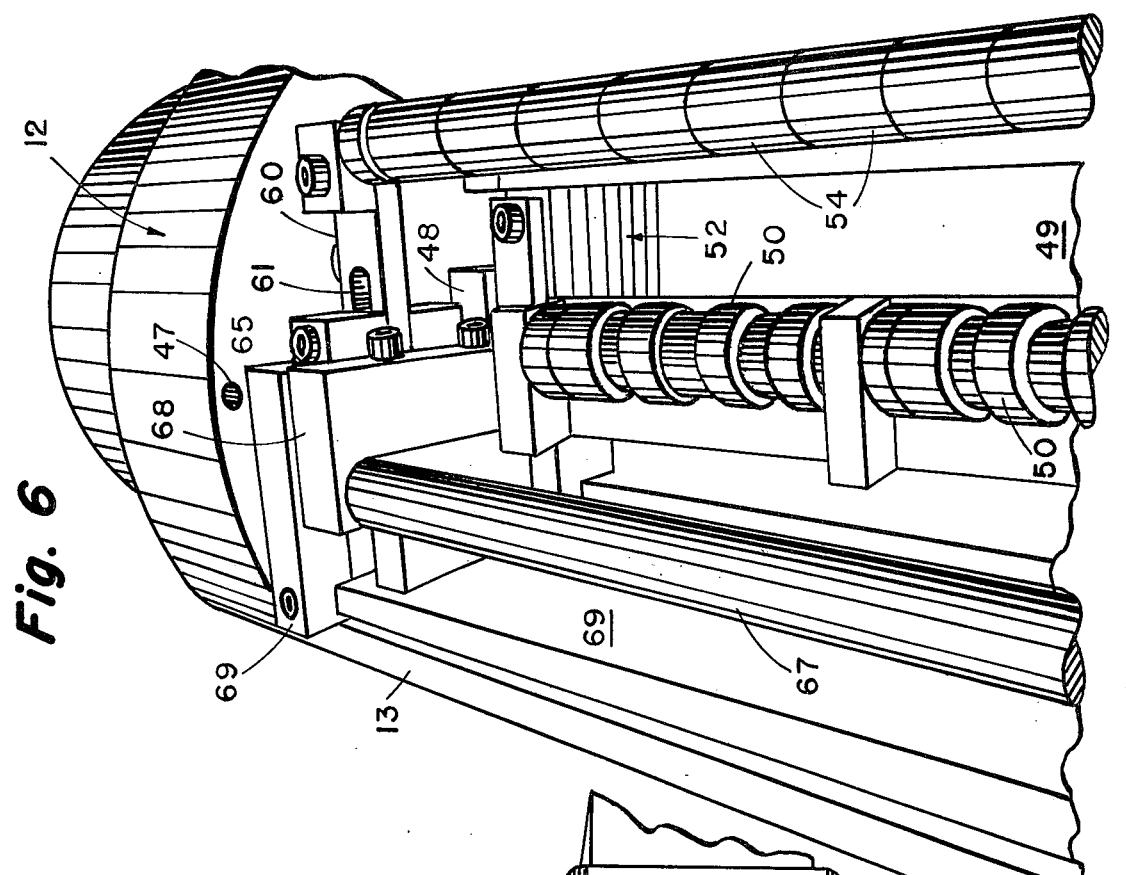
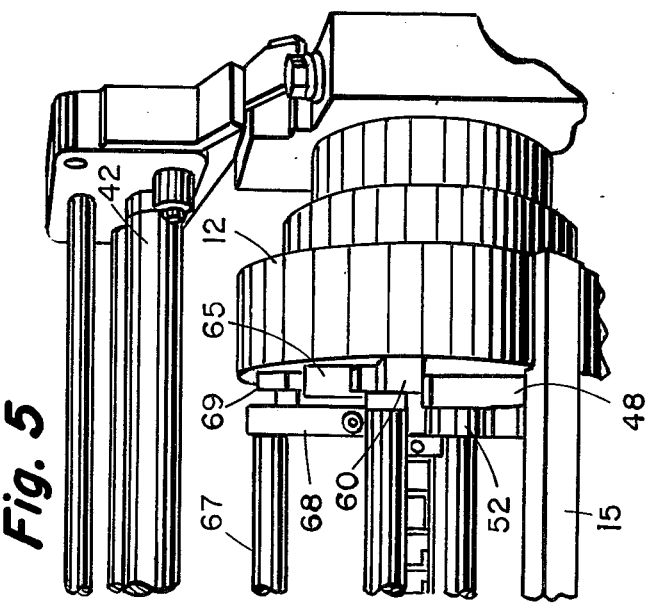
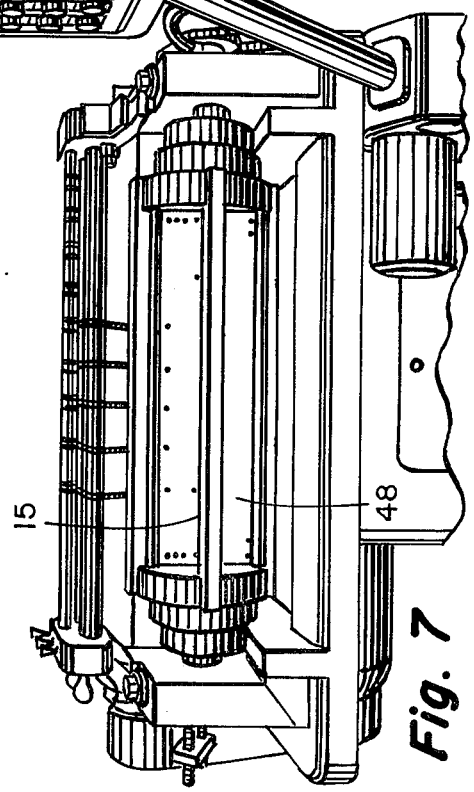

APPARATUS FOR CUTTING TUBES

BACKGROUND AND SUMMARY

The present invention relates to apparatus for cutting tubes. It is particularly adapted to cutting paper tubes. Paper tubes have a number of uses in various industries. They are of particular utility in the electrical and electronics industries where they are used for forms for coils, transformers, inductors and the like. The size of the paper tube varies with the application, but paper tubes have been made ranging in size from less than a quarter of an inch O.D. to as great as seven inches O.D. Further, depending upon the application, the thickness of the wall of the tube may vary from a very thin tube to one having a wall thickness of 175 mils. Different techniques have been used for cutting paper tubes in the industry. For example, for small, thin-walled tubes which are flexible and somewhat difficult to saw, a snap cutter of the type disclosed in my copending application Ser. No. 806,106, filed June 13, 1977, for "Snap-Cutter for Paper Tubes", are successful. Where the tubes are made on an automatic winding machine, such a machine may be equipped with conventional saws for cutting the tubes into the longer lengths normally found in the initial manufacturing stages. That is, a plurality of tapes are wound onto an arbor in a continuous fashion and laminated together adhesively. In this initial stage, the tubes are cut to relatively long lengths, and taken to a separate location for cutting into the shorter, more precise lengths required by the customer.

Another technique used in cutting smaller thin-walled tubes is to hold the tubes in such a fashion that they can be surface-driven at a relatively high speed and then moved into cutting position. Although this technique may be used for smaller tubes, it, as well as other known techniques, have proven difficult in the cutting of larger tubes (because of the design involved, up to seven inches O.D., for example) as well as in the cutting of thick tubes (having a wall thickness of approximately 170 mils. and an O.D. of approximately 3½ inches).

According to the present invention, apparatus includes a cradle for holding a tube to be cut. The cradle is mounted for rotation about its axis. A plurality of saws are mounted on a shaft having its axis parallel to the axis of the cradle, and the saws are driven at high speed during operation. The cradle is rotated between a loading position in which the tubes are placed in the cradle, and a cutting position adjacent the saws. Surface drive means are provided adjacent the cutting station for spinning the tube held in the cradle. Thus, the cradle can be rotated at a fairly high speed from the loading position through the cutting position and back to the loading position. In other words, one complete revolution of the cradle defines a cutting cycle.

In the case of thick-walled paper tubes (for example, tubes having a thickness in the range of 0.100–0.200 inches), the cradle is brought to a stop for a limited period of time of the order of two seconds just as the tube enters the cutting station to enable saws to make partial peripheral cuts in the tube. This momentary interruption in the rotation of the cradle enables the saws to cut thick-walled tubes without causing a bend in the tube, and while permitting the cradle to rotate through its cycle at a high speed, except for the momentary stop at the initiation of cutting. The high-speed rotation of the cradle is important when it is considered that paper tubes of this type are cut at the rate of 150–200 tubes per hour. Such savings in time in the operating cycle of the machine greatly increase production.

The present invention thus provides for tube-cutting apparatus which is adaptable for a wide range of outer diameters and wall thicknesses of paper tubes. Other features and advantages of the present invention will be apparent to persons skilled in the art from the following detailed description of a preferred embodiment accompanied by the attached drawing wherein identical reference numerals will refer to like parts in the various views.

THE DRAWING

FIG. 3 is an upper right side perspective view of the apparatus of FIG. 1;

FIG. 4 is an upper left side perspective view of the apparatus of FIG. 1 with the cradle rotated to an initial cutting position;

FIG. 5 is a close-up, fragmentary perspective view of the right side of the cradle illustrating details of construction;

FIG. 6 is an upper perspective view of the right side of the cradle, again in fragmentary form;

FIG. 7 is a frontal perspective of the apparatus of FIG. 1 with the cradle in the cutting position.

DETAILED DESCRIPTION

Figure 1:
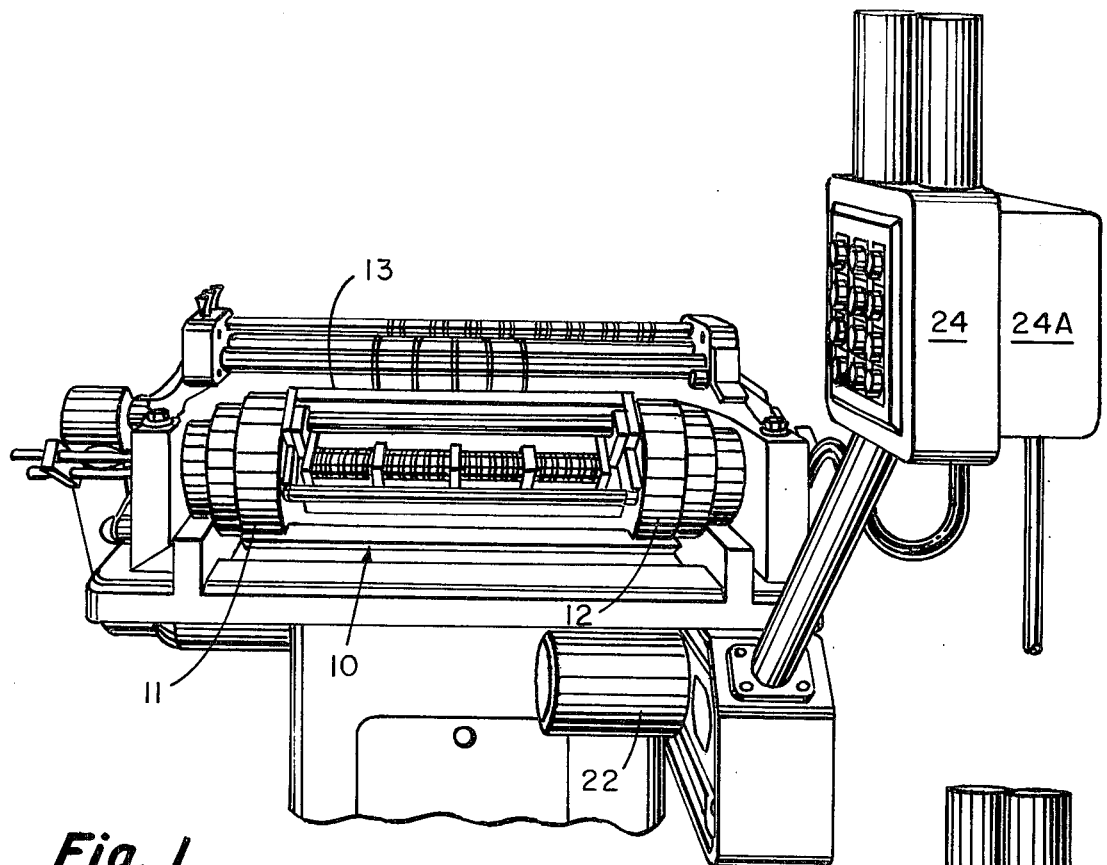
FIG. 1 is an upper frontal perspective view of apparatus constructed according to the present invention with the cradle in the load position.
Figure 2:
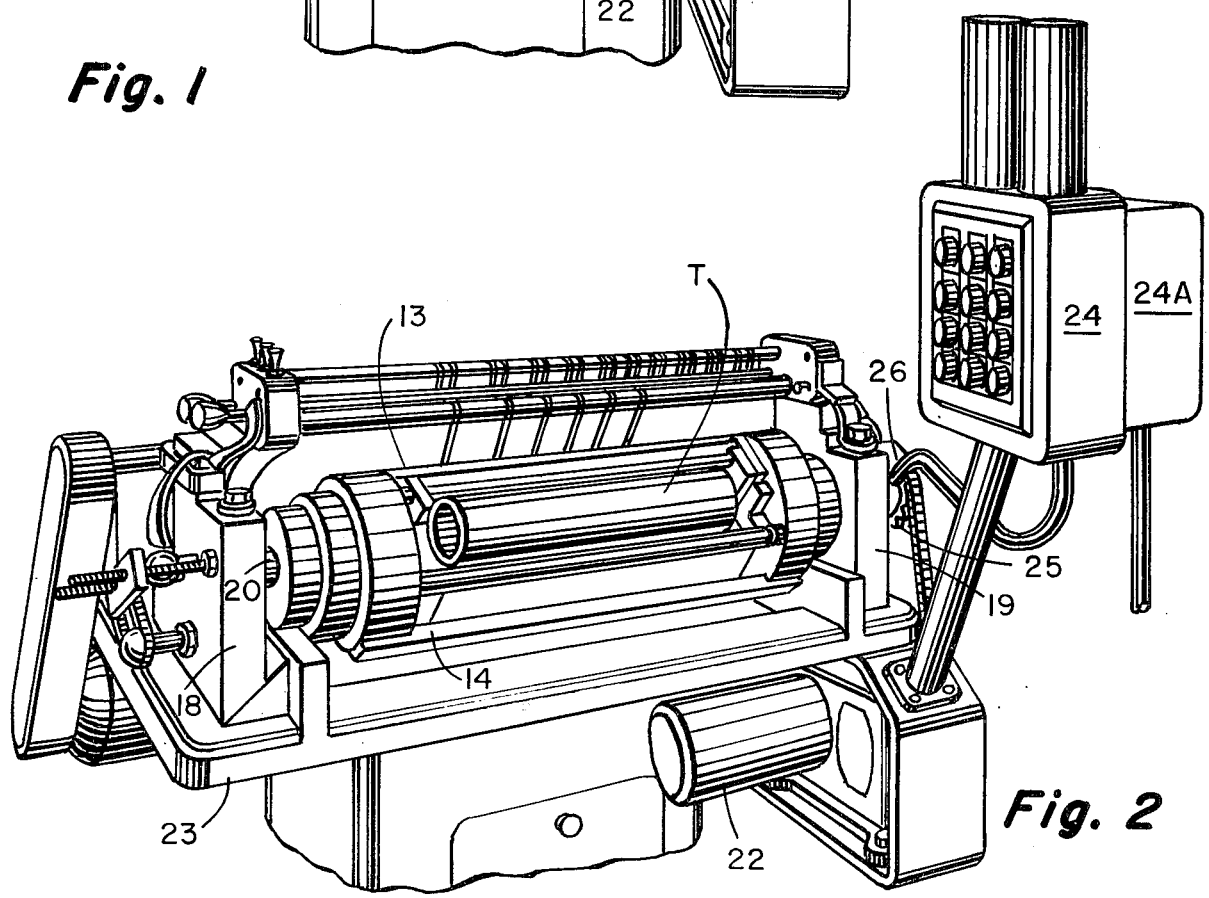
FIG. 2 is a view similar to FIG. 1 but taken slightly to the left thereof with a tube in the cradle at the load station.

Referring first to FIGS. 1 and 2, reference numeral 10 generally designates a drum or cradle adapted to hold a tube, designated T in FIG. 2. The tube T shown in FIG. 2 is approximately three inches in diameter and has a wall thickness of about 175 mils.

The cradle 10 includes first and second side cylinders 11, 12 which are held together into a rigid element by means of three spacer bars 13 (FIG. 1), 14 and 15 (FIG. 2). The cradle is mounted to left and right side frame members 18, 19 by suitable journaled sub-shafts, one of which is designated 20 in FIG. 2. The side frames are mounted on a bed 23.

The cradle 10, as shown in FIGS. 1 and 2, is in the load position—that is, the tube T can be loaded into the cradle and supported by it. As will be more fully described below, the tube T may, however, be rotated about its own axis—that is, spun—within the cradle.

The cradle is driven by electric motor 22, which, in turn, is operated by conventional circuitry held in a control box 24. The shaft of the motor 22 is coupled to the right-hand sub-shaft of the cradle (which extends through the side frame member 19) by means of a chain 25 and a sprocket 26.

Referring now to FIGS. 3 and 4, there is shown a saw generally designated by reference numeral 30 and including three laterally spaced individual cutting blades 31, 32 and 33, mounted on a common shaft 34. The shaft 34 is driven by a motor 35 (FIG. 4), the drive being driven by a conventional V-belt pulley mounted within a protective covering 36. In this embodiment, although it is not necessary for a practice of the invention, the saws are continuously and independently driven at high speed by the motor 35 during the operation of the machine.

As seen in all of FIGS. 1–4, a plurality of belts, designated 40 (five are shown in the illustrated embodiment) are used to engage the surface of the tube T in the cutting position (that is, when the tube is rotated by means of the cradle approximately 60°–70° clockwise when viewed from the right to the position shown in FIG. 4 where the saws begin to cut the tube).

The belts 40 are guided by a pair of upper parallel bars 42, and they are driven by a lower shaft 43 (FIG. 3). The shaft 43 is driven by means of a chain and sprocket combination generally designated 44 which, in turn, is driven by a motor 45 through a right-angle gear 46. The surface speed of the belts 40 is such as to spin the tubes in the cradle at a high speed relative to the speed of rotation of the cradle.

Turning now to FIGS. 5–7, the construction of the cradle will be described in more detail. The structure is the same on either side of the cradle, hence, only the construction details of the right side of the cradle, associated with the disc 12, need be discussed in further detail for a complete understanding of the invention. A series of tapped holes, one of which is shown in FIG. 6 and designated by reference numeral 47 is formed on the inner surface of the disc 12. These holes extend along a radial line outwardly from the center of the disc which is the axis of rotation of the cradle, and their primary function is to permit adjustability of the supports in the cradle so that tubes of different size may be cut.

Thus, a support bar 48 is secured by means of a nut, not shown, to the disc 12 by threading into one of the apertures 47. A base plate 49 is secured to the bottom of the support bar 48 (and to a similar bar on the other disc 11) again, by bolts. A first set of idler rollers, 50, is secured to the base plate 49 by means of a plurality of spacer bars 52. The number of spacer bars used will, of course, depend upon the size of the tube. The rollers 50 support the tube while permitting it to be spun at a high speed, as indicated above.

A second set of rollers 54 is secured to a slotted bracket 60 which, in turn, is connected to a second support bar 65 attached to the disc 12 in one of the previously described holes 47. The bracket 60 includes a slot 61 permitting it to be adjusted according to the size of the tube being cut. The bracket 60 is held to the support 65 by a nut-equipped bolt extending through the slot 61 and folded on the other end.

A third support bar 67 is held by a bracket 68 which is mounted to a second base plate 69 attached by screws to the base plate 49 and extending at right angles to it. The second base plate 69 is further secured by attachment to a bar 69 attached to the inner surface of the disc 12. The bar 67 may be journaled in its associated side mounts to further facilitate spinning of the tubes at the cutting station. Thus, the actual support for the tubes of smaller diameter (although such tubes are large when compared with the truly small tubes made in this industry) is formed by the rollers 50, 54 and the rotating bar 67; and all of these bars are held by supports which are removably attached to the side discs of the cradle.

Referring back to FIGS. 1 and 2, reference numeral 24A indicates a conventional timer attached to the control box 24. When the three motors are started, and particularly the motor 22 which drives the cradle, the cradle rotates from the load position of FIGS. 1 and 2 to the cutting position at which sawing commences.

Referring now to FIG. 3, at the initiation of sawing, a cam surface 85 on the right stub-shaft of the cradle closes a switch 86 mounted to the side frame member 19 which supports the cradle. When the switch is closed, the timer 24A interrupts rotation of the cradle. It does not interrupt the surface drive of the tubes by the belts 42 which continue to spin the tubes at high speed. Nor does it interrupt the drive of the cutting saws 30. Thus, the saws are permitted to partially cut the tube for so long as the timer interrupts the operation of the cradle drive motor. Although some adjustments may be needed, depending upon the thickness of the tube, I have found that for tubes having a wall thickness of approximately 175 mils. and an outer diameter of approximately three inches, made from laminated kraft paper tapes, a stop period of approximately two seconds by the timer 24A enables the saws to form a partial cut (which may be a complete peripheral cut about the tube) without denting or bending the wall of the tube and permitting the cradle to rotate at its normal production speed the remainder of the cycle.

Figure 8:
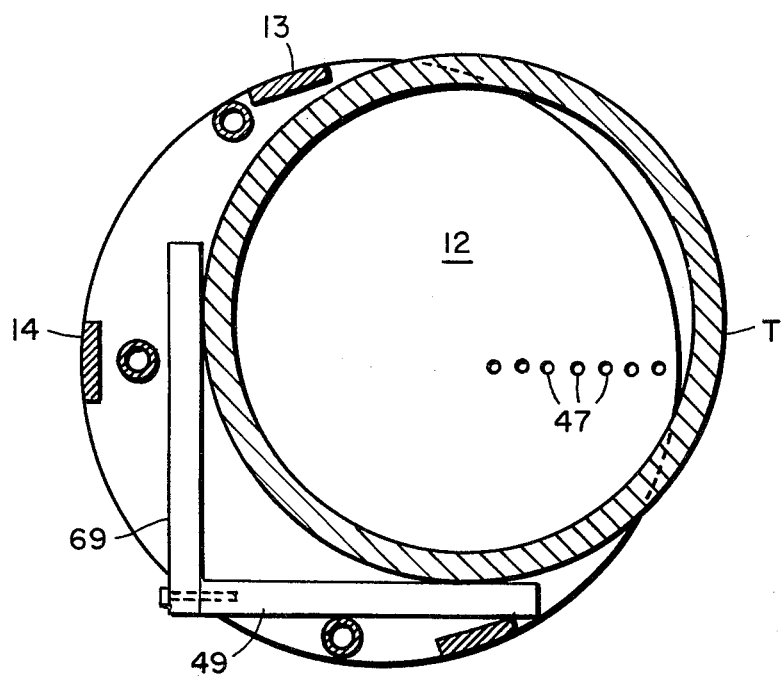
FIGS. 8 and 9 are vertical cross sectional views taken transversely of the axis of the cradle illustrating its modification for accommodating cylinders of greater diameter and thinner walls.
Figure 9:
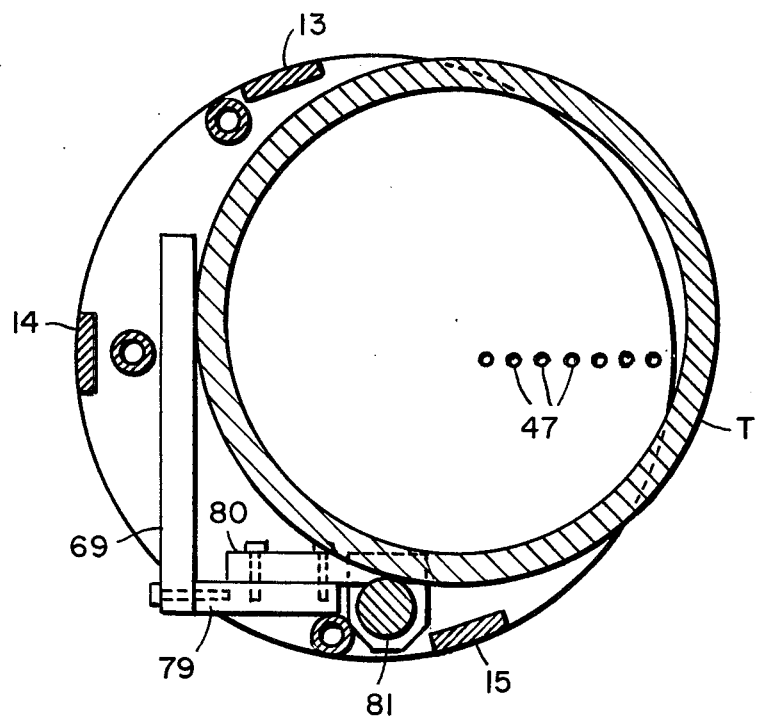

Turning now to FIGS. 8 and 9, the right side disc is again designated by reference numeral 12, and the adjusting apertures 47 are seen in greater detail. However, in these illustrations, the cradle is modified to receive a tube T of much larger radius—up to seven inches. In the case of FIG. 8, the adjusting brackets and spacers 42, 60, 65, 68 and 69 of FIG. 6 are removed, leaving only the base plate 49 and the upright plate 69 secured to it. If it is desired to provide less friction to the tube in the cradle, to permit high-speed spinning by the surface drive means comprising the belts described above, the base plate 49 may be replaced by a partial base plate 79 as seen in FIG. 9; and in this case, a pair of brackets (one of which is designated 80 may be secured to the base plate 79 to provide a mounting for a roller 81. Thus, the tube T is supported in this embodiment by means of the roller 81 and the upright support plate 69. Again, depending upon the application, it may not be necessary to interrupt the rotation of the cradle as sawing commences, and this has been found to be the case where the thickness of the walls of the larger tube is less than approximately 100 mils.

There has thus been described apparatus for cutting paper tubes which is adjustable to accommodate tubes of various diameters, all of which are over one and a half inches and hence are large in this industry, and also to accommodate tubes of various wall thickness while using the cycle time of the apparatus in taking the tubes away from the operator at the load station, transporting them to the cutting station and returning them after cutting. If the operation of the timer is not required, the limit switch 86 may simply be removed from its mount.

Having thus disclosed in detail preferred embodiments of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. Apparatus for cutting a long paper tube into individual sections comprising: cradle means for holding the tube; means for mounting said cradle for rotation about a horizontal axis; means for driving said cradle in rotation from a load position through a cutting position and back to a load position; a plurality of saws mounted on a shaft having an axis parallel to the axis of rotation of said cradle; means for driving said saws at high speed; surface-drive means for engaging the surface of said tube at the cutting position for spinning the tube in said cradle during cutting, said cradle including a pair of end discs; means for securing said discs together to form a balanced rotatable member; a pair of stub shafts secured to said discs respectively for supporting the same while permitting the rotation thereof; first and second base plates extending between and mounted to said side discs and spaced at right angles toward the periphery of said disc to permit the support of a tube of large diameter approaching the diameter of said discs.

2. The apparatus of claim 1 further comprising rotatable roller means mounted to one of said plates and at least partially supporting said tube in said cradle.

* * * * *